(12) United States Patent
Guo et al.

(10) Patent No.: US 11,922,691 B2
(45) Date of Patent: Mar. 5, 2024

(54) AUGMENTED REALITY SYSTEMS FOR COMPARING PHYSICAL OBJECTS

(71) Applicant: Adobe Inc., San Jose, CA (US)

(72) Inventors: Shunan Guo, San Jose, CA (US); Ryan A. Rossi, San Jose, CA (US); Jane Elizabeth Hoffswell, Seattle, WA (US); Fan Du, Milpitas, CA (US); Eunyee Koh, San Jose, CA (US); Bingjie Xu, Evanston, IL (US)

(73) Assignee: Adobe Inc., San Jose, CA (US)

( * ) Notice: Subject to any disclaimer, the term of this patent is extended or adjusted under 35 U.S.C. 154(b) by 58 days.

(21) Appl. No.: 17/724,686

(22) Filed: Apr. 20, 2022

(65) Prior Publication Data

US 2023/0343091 A1    Oct. 26, 2023

(51) Int. Cl.
*G06V 20/20* (2022.01)
*G06T 7/70* (2017.01)
*G06T 19/00* (2011.01)
*H04N 23/63* (2023.01)

(52) U.S. Cl.
CPC ............... *G06V 20/20* (2022.01); *G06T 7/70* (2017.01); *G06T 19/006* (2013.01); *H04N 23/631* (2023.01); *G06T 2207/30204* (2013.01)

(58) Field of Classification Search
CPC ......... G06V 20/20; G06T 7/70; G06T 19/006; G06T 2207/30204; H04N 23/631
See application file for complete search history.

(56) References Cited

U.S. PATENT DOCUMENTS

| | | | |
|---|---|---|---|
| 2010/0185529 A1* | 7/2010 | Chesnut | G06Q 30/0601 705/26.1 |
| 2014/0100997 A1* | 4/2014 | Mayerle | G06T 19/006 705/27.2 |
| 2014/0118339 A1* | 5/2014 | Davies | G06T 7/80 345/419 |

(Continued)

OTHER PUBLICATIONS

Ahn, Junho, et al., "Supporting Healthy Grocery Shopping via Mobile Augmented Reality", ACM Transactions on Multimedia Computing, Communications, and Applications, vol. 12, No. 1 [retrieved Jan. 19, 2022]. Retrieved from the Internet <DOI:10.1145/2808207>, Oct. 21, 2015, 24 Pages.

(Continued)

*Primary Examiner* — Jitesh Patel
(74) *Attorney, Agent, or Firm* — FIG. 1 Patents

(57) ABSTRACT

In implementations of augmented reality systems for comparing physical objects, a computing device implements a comparison system to detect physical objects and physical markers depicted in frames of a digital video captured using an image capture device and displayed in a user interface. The comparison system associates a physical object of the physical objects with a physical marker of the physical markers based on an association distance estimated using two-dimensional coordinates of the user interface corresponding to a center of the physical object and a distance from the image capture device to the physical marker. Characteristics of the physical object are determined that are not displayed in the user interface based on an identifier of the physical marker. The comparison system generates a virtual object for display in the user interface that includes indications of a subset of the characteristics of the physical object.

20 Claims, 18 Drawing Sheets

(56) References Cited

U.S. PATENT DOCUMENTS

| | | | | |
|---|---|---|---|---|
| 2014/0314276 | A1* | 10/2014 | Wexler | G06T 3/0012 382/103 |
| 2016/0048732 | A1* | 2/2016 | Matoba | G06T 7/73 345/633 |
| 2018/0174220 | A1* | 6/2018 | Jadhav | G06Q 30/0631 |
| 2019/0197561 | A1* | 6/2019 | Adato | G06T 7/73 |

OTHER PUBLICATIONS

Avery, Benjamin, et al., "Improving Spatial Perception for Augmented Reality X-Ray Vision", 2009 IEEE Virtual Reality Conference [retrieved Jan. 14, 2022]. Retrieved from the Internet <http://citeseerx.ist.psu.edu/viewdoc/download;jsessionid=66F1623FFF13B6923D15194C6D46E3F0?doi=10.1.1.715.8414&rep=rep1&type=pdf>., Mar. 2009, 4 Pages.

Bastan, Muhammet, et al., "Multi-View Product Image Search Using Deep ConvNets Representations", Cornell University arXiv, arXiv.org [retrieved Jan. 14, 2022]. Retrieved from the Internet <https://arxiv.org/pdf/1608.03462.pdf>., Aug. 11, 2016, 13 Pages.

Breen, David E, et al., "Interactive Occlusion and Automatic Object Placement for Augmented Reality", Computer Graphics Forum, vol. 15, No. 3 [retrieved Jan. 14, 2022]. Retrieved from the Internet <http://www.cs.iupui.edu/~tuceryan/research/AR/eg96.pdf>., Aug. 1996, 12 Pages.

Cheng, Kelvin, et al., "MR-Shoppingu: Physical Interaction with Augmented Retail Products Using Continuous Context Awareness", International Conference on Entertainment Computing [retrieved Jan. 14, 2022]. Retrieved from the Internet <https://hal.inria.fr/hal-01771288/document>., Apr. 19, 2018, 5 Pages.

Dacko, Scott G, "Enabling smart retail settings via mobile augmented reality shopping apps", Technological Forecasting and Social Change, vol. 124 [retrieved Jan. 14, 2022]. Retrieved from the Internet <https://core.ac.uk/download/pdf/46522237.pdf>., Nov. 1, 2017, 52 Pages.

Dou, Hao, et al., "Show Something: Intelligent Shopping Assistant Supporting Quick Scene Understanding and Immersive Preview", International Conference on Human-Computer Interaction [retrieved Jan. 14, 2022]. Retrieved from the Internet <http://iplab.jpn.org/paper/hcii2019dou.pdf>., Jun. 2019, 14 Pages.

Elsayed, Neven, et al., "Situated Analytics", Journal of Visual Languages and Computing 36 [retrieved Jan. 14, 2021]. Retrieved from the Internet <https://wearables.unisa.edu.au/uploads/1/2/7/6/127656642/neven-jvc-2016-final.pdf>., Sep. 2015, 11 Pages.

Filax, Marco, et al., "Grocery Recognition in the Wild: A New Mining Strategy for Metric Learning", VISIGRAPP, vol. 4 [retrieved Jan. 18, 2022]. Retrieved from the Internet <https://pdfs.semanticscholar.org/ea51/d5dc686e113566e6ab62149abe14bb5241cf.pdf>., Jan. 1, 2021, 8 Pages.

Ganapathy, Subhashini, et al., "MAR Shopping Assistant Usage: Delay, Error, and Utility", VR '11: Proceedings of the 2011 IEEE Virtual Reality Conference [retrieved May 27, 2022]. Retrieved from the Internet <https://doi.org/10.1109/VR.2011.5759471>, Mar. 19, 2011, 2 pages.

George, Marian, et al., "Fine-Grained Product Class Recognition for Assisted Shopping", IEEE International Conference on Computer Vision [retrieved Jan. 18, 2022]. Retrieved from the Internet <http://www.vs.inf.ethz.ch/publ/papers/mageorge_assistant_acvr2015.pdf>., Dec. 7, 2015, 9 Pages.

Haller, Michael, et al., "A real-time shadow approach for an augmented reality application using shadow volumes", VRST '03: Proceedings of the ACM symposium on Virtual reality software and technology [retrieved Jan. 18, 2022]. Retrieved from the Internet <https://citeseerx.ist.psu.edu/viewdoc/download?doi=10.1.1.100.6727&rep=rep1&type=pdf>., Oct. 1, 2003, 10 Pages.

Jayananda, P.K.V, et al., "Augmented Reality Based Smart Supermarket System with Indoor Navigation using Beacon Technology (Easy Shopping Android Mobile App)", 2018 IEEE International Conference on Information and Automation for Sustainability (ICIAfS) [retrieved Jan. 14, 2022]. Retrieved from the Internet <doi: 10.1109/ICIAFS.2018.8913363>., Dec. 2018, 6 Pages.

Kalkofen, Denis, et al., "Explosion Diagrams in Augmented Reality", IEEE Virtual Reality Conference [retrieved Jan. 18, 2022]. Retrieved from the Internet <http://citeseerx.ist.psu.edu/viewdoc/download?doi=10.1.1.420.6275&rep=rep1&type=pdf>., Mar. 14, 2009, 8 Pages.

Kalkofen, Denis, et al., "Visualization Techniques for Augmented Reality", in: Handbook of Augmented Reality, Springer, New York [retrieved Jan. 18, 2022]. Retrieved from the Internet <https://magicvisionlab.com/pub/kalkofen_bookchapter11/paper.pdf>., Jul. 2011, 34 Pages.

Leykin, Alex, et al., "Determining text readability over textured backgrounds in augmented reality systems", Proceedings of the 2004 ACM SIGGRAPH international conference on Virtual Reality continuum and its applications in Industry [retrieved Jan. 19, 2022]. Retrieved from the Internet <http://www.cs.iupui.edu/~tuceryan/research/AR/vrcai04-436-439-leykin.pdf>., Jun. 16, 2004, 4 Pages.

Li, Zhinan, et al., "Augmented Reality Shopping System Through Image Search and Virtual Shop Generation", International Conference on Human-Computer Interaction [retrieved Jan. 19, 2022]. Retrieved from the Internet <http://iplab.jpn.org/paper/hcii2020liz.pdf>., Jul. 2020, 14 Pages.

Lowe, David G, "Object Recognition from Local Scale-Invariant Features", Computer Vision, 1999. The Proceedings of the Seventh IEEE International Conference, Kerkyra, Greece [retrieved Jan. 19, 2022]. Retrieved from the Internet <http://people.eecs.berkeley.edu/~efros/courses/AP06/Papers/lowe-iccv-99.pdf>., Sep. 1999, 8 pages.

Merler, Michele, et al., "Recognizing Groceries in situ Using in vitro Training Data", IEEE Conference on Computer Vision and Pattern Recognition [retrieved Jan. 19, 2022]. Retrieved from the Internet <http://www1.cs.columbia.edu/~mmerler/grozi_slam.pdf>., Jun. 2007, 8 Pages.

Mittal, Trisha, et al., "A Logo-Based Approach for Recognising Multiple Products on a Shelf", Proceedings of SAI Intelligent Systems Conference [retrieved May 27, 2022]. Retrieved from the Internet <https://doi.org/10.1007/978-3-319-56991-8_2>, Aug. 23, 2017, 8 pages.

Rashid, Zulqarnain, et al., "Bringing online shopping experience to offline retail through augmented reality and RFID", 2015 5th International Conference on the Internet of Things (IOT) [retrieved Jan. 19, 2022]. Retrieved from the Internet <DOI: 10.1109/IOT.2015.7356547>, Oct. 2015, 7 Pages.

Spreer, Philipp, et al., "Improving the In-Store Customer Information Process using Mobile Augmented Reality", International Conference on Research in Advertising [retrieved Retrieved Jan. 19, 2022]. retrieved from the Internet <https://www.researchgate.net/publication/237085820_Improving_the_In-Store_Customer_Information_Process_using_Mobile_Augmented_Reality>., Jun. 2012, 11 Pages.

Tanaka, Kohei, et al., "An information layout method for an optical see-through head mounted display focusing on the viewability", ISMAR '08: Proceedings of the 7th IEEE/ACM International Symposium on Mixed and Augmented Reality [retrieved Jan. 19, 2022]. Retrieved from the Internet <10.1109/ISMAR.2008.4637340>, Sep. 15, 2008, 5 Pages.

Vallance, Scott, et al., "Context in 3D planar navigation", AUIC '01: Proceedings of the 2nd Australasian conference on User interface [retrieved Jan. 19, 2022]. Retrieved from the Internet <https://core.ac.uk/download/pdf/14946807.pdf>., Jan. 25, 2001, 7 Pages.

White, Sean, et al., "Virtual Vouchers: Prototyping a Mobile Augmented Reality User Interface for Botanical Species Identification", VR '06: Proceedings of the IEEE conference on Virtual Reality [retrieved Jan. 19, 2022]. Retreived from the Internet <http://www1.cs.columbia.edu/~swhite/pubs/white-2006-3dui.pdf>., Mar. 25, 2006, 9 Pages.

Zhu, Wei, et al., "Design of the PromoPad : an Automated Augmented Reality Shopping Assistant", 12th Americas Conference on Information Systems, AMCIS 2006 [retrieved Jan. 19,

(56) References Cited

OTHER PUBLICATIONS

2022]. Retrieved from the Internet <http://citeseerx.ist.psu.edu/viewdoc/download?doi=10.1.1.85.2629&rep=rep1&type=pdf>., Aug. 2006, 16 Pages.

* cited by examiner

400

402
Detect physical objects and physical markers depicted in frames of a digital video captured by an image capture device of a computing device and displayed in a user interface of the computing device

404
Associate a physical object of the physical objects with a physical marker of the physical markers based on an association distance estimated using two-dimensional coordinates of the user interface corresponding to a center of the physical object and a distance from the image capture device to the physical marker

406
Determine characteristics of the physical object that are not displayed in the user interface based on an identifier of the physical marker

408
Generate a virtual object for display in the user interface that includes indications of a subset of the characteristics of the physical object and an additional virtual object that includes indications of characteristics of an additional physical object of the physical objects

*Fig. 4*

AUGMENTED REALITY SYSTEMS FOR COMPARING PHYSICAL OBJECTS

BACKGROUND

In an augmented reality environment, a user experience is controlled by a computing device that generates virtual objects to augment a user's direct view of a physical environment. For example, the user interacts within the augmented reality environment via a user interface that displays frames of a digital video depicting physical objects disposed in the physical environment. The displayed frames also depict virtual objects that are generated by the computing device and which do not exist in the physical environment. Although augmented reality systems are capable of generating virtual objects that appear to be physical objects (e.g., look like real objects), the virtual objects are distinguishable from the physical objects depicted in the frames of the digital video because the virtual objects are only viewable via the user interface.

Augmented reality systems are also capable of generating virtual objects based on information available in the physical environment to further augment the user experience. For instance, physical markers in the physical environment encode information about the physical environment, and the computing device detects the physical markers using an image capture device (e.g., a digital camera). The computing device then decodes the information about the physical environment and generates virtual objects in the user interface relative to the physical markers that display the information about the physical environment to the user.

By leveraging different techniques for encoding and/or detecting information about a physical environment, conventional systems are capable of generating a virtual object that displays a characteristic of physical objects in the physical environment such the physical objects are comparable based on the characteristic displayed by the virtual object. For example, the physical objects are physical products and the virtual object displays a characteristic of the physical products such as cost, popularity, rating, etc. However, conventional systems for comparing physical objects that detect physical markers and display virtual objects indicating information about the physical objects for comparison are limited to displaying whatever information is encoded in the physical markers. Conventionally, this information includes a single characteristic of a physical object. As a result, conventional systems for comparing physical objects are limited to generating virtual objects that display a single characteristic of multiple physical objects which is a shortcoming of these systems.

SUMMARY

Augmented reality systems are described for comparing physical objects. The physical objects (real objects) are comparable using virtual objects (computer generated objects) that display information about the physical objects. In an example, a computing device implements a comparison system to detect physical objects and physical markers depicted in frames of a digital video captured by an image capture device and displayed in a user interface. The comparison system associates a physical object of the physical objects with a physical marker of the physical markers based on an association distance estimated using two-dimensional coordinates of the user interface corresponding to a center of the physical object and a distance from the image capture device to the physical marker.

The comparison system determines characteristics of the physical object that are not displayed in the user interface based on an identifier of the physical marker. A virtual object is generated for display in the user interface relative to the physical object depicted in the frames of the digital video. For example, the virtual object includes indications of a subset of the characteristics of the physical object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 is a flow diagram depicting a procedure in an example implementation in which a physical object is detected and a virtual object is generated for display in a user interface that includes indications of a subset of characteristics of the physical object.

FIGS. 5A, 5B, 5C, 5D, 5E, 5F, 5G, and 5H illustrate a user interface of augmented reality systems for comparing physical objects.

DETAILED DESCRIPTION

Overview

Figure 1:
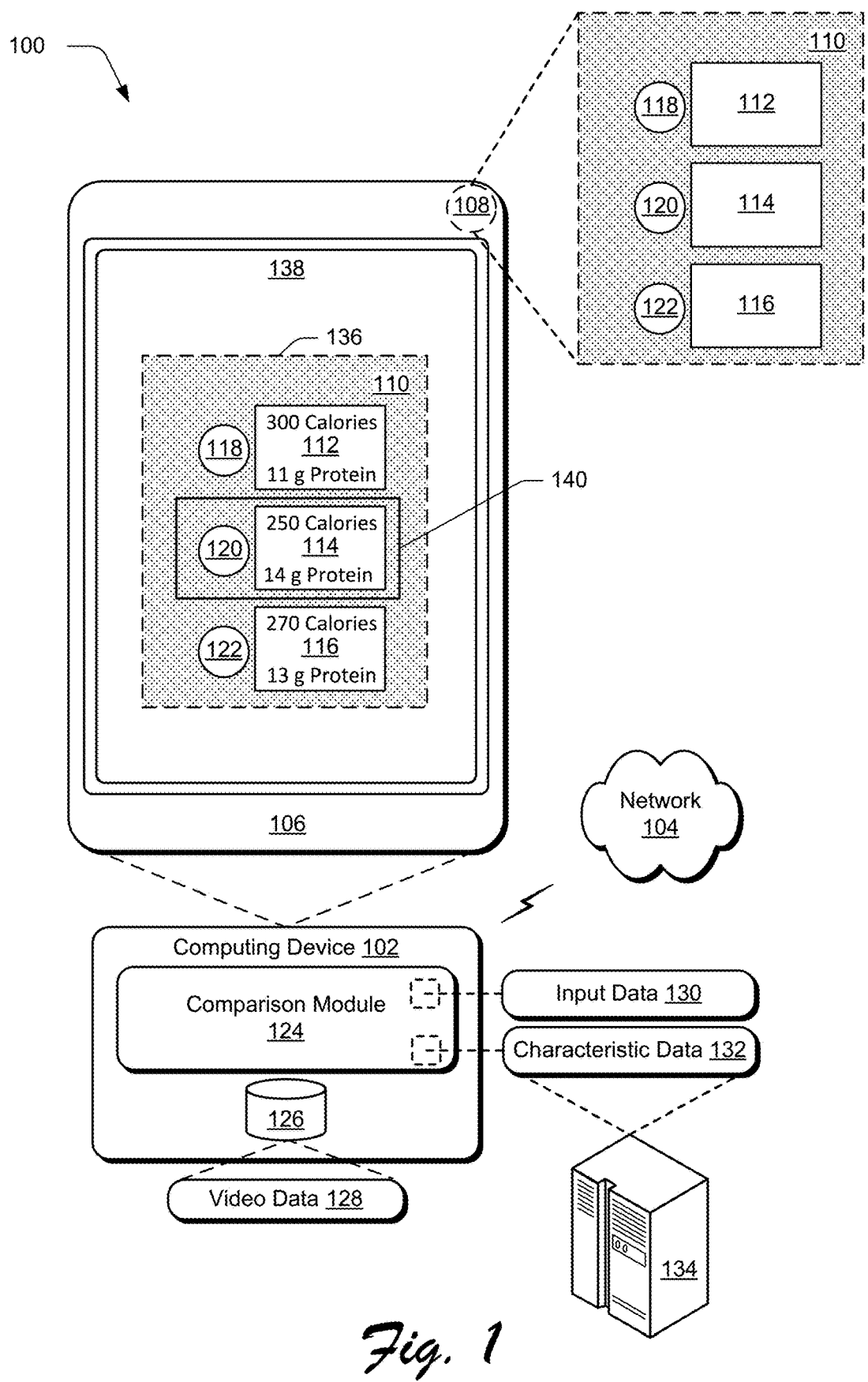
FIG. 1 is an illustration of an environment in an example implementation that is operable to employ digital systems and techniques as described herein.

Conventional augmented reality systems for comparing physical objects are limited to generating virtual objects that display information encoded in physical markers which is static and often limited to describing a single characteristic of multiple physical objects. For example, the multiple physical objects are comparable based on similarities or differences between the characteristic displayed for different ones of the multiple physical objects. However, conventional systems are not capable generating virtual objects that dynamically display multiple characteristics of multiple physical objects such that the multiple physical objects are comparable based on the multiple characteristics. This is a shortcoming of conventional systems particularly in scenarios which involve relationships or tradeoffs between characteristics included the multiple characteristics.

In order to overcome the limitations of conventional systems, augmented reality systems are described for comparing physical objects. In one example, a computing device implements a comparison system to detect physical objects and physical markers depicted in frames of a digital video captured by an image capture device and displayed in a user interface. For instance, the physical markers (barcode markers, pattern markers, Hiro markers, etc.) are detected using marker detection functionality included in an AR.js library and the physical objects are detected using a machine learning model trained on training data (e.g., digital images depicting the physical objects) to detect the physical objects.

The comparison system associates detected physical markers with detected physical objects based on association distances which pair a detected physical marker with a closest detected physical object to the detected physical marker. To estimate an association distance, two-dimensional coordinates of the user interface corresponding to a center position of the detected physical object are projected or converted into three-dimensional world coordinates and a distance between the image capture device and the detected physical marker is used as a distance between the image capture device and the detected physical object. By pairing the detected physical markers with the detected physical objects based on the association distances, the comparison system ensures that multiple detected physical markers are not paired with a single detected physical object and that multiple detected physical objects are not paired with a single detected physical marker.

For each of the detected physical markers, the comparison system determines a center position, a size, a three-dimensional orientation, and a physical object identifier corresponding to a detected physical object associated with the detected physical marker based on an association distance between the detected physical object and the detected physical marker. For each of the detected physical objects, the comparison system determines a center position, a size, and a physical object identifier of the detected physical object.

The comparison system determines characteristics of a detected physical object that are not displayed in the user interface. To do so in one example, the comparison system transmits data describing a physical object identifier of the detected physical object to a characteristic database via a network. In response to receiving the data describing the physical object identifier, the characteristic database transmits data describing the characteristics of the detected physical object to the comparison system via the network.

In an example, a user generates input data by interacting with an input device (e.g., a stylus, a microphone, a finger and a touchscreen, etc.) relative to the user interface to specify a subset of the characteristics of the detected physical object to compare with corresponding characteristics of additional detected physical objects. Consider an example in which the physical objects are dietary supplements such as protein bars and the user interacts relative to the user interface to specify a subset of characteristics as calories, protein, and total fat. In this example, the comparison system receives the input data and processes the input data to generate a virtual object for display in the user interface that includes indications of a number of calories in the protein bar, an amount of protein in the protein bar, and an amount of total fat in the protein bar.

The comparison system displays the virtual object in the user interface over the detected physical object (the protein bar) such that the displayed virtual object has a three-dimensional orientation of a detected physical marker that is associated with the detected physical object. For instance, this aligns the displayed virtual object with an orientation of the detected physical object based on a location of the image capture device. The comparison system also displays an additional virtual object in the user interface over each detected physical object (each protein bar) depicted in the frames of the digital video. Each additional virtual object also indicates a number of calories in a corresponding protein bar, an amount of protein in the corresponding protein bar, and an amount of total fat in the corresponding protein bar.

In an example, the displayed virtual object and the displayed additional virtual objects include radar charts. The radar charts visually indicate relative values of the number of calories, the amount of protein, and the amount of total fat included in each detected protein bar depicted in the digital video. Unlike conventional systems which are capable of displaying virtual objects that indicate a single characteristic (e.g., just calories), the radar charts facilitate a visual comparison of the physical objects (the protein bars) such that a particular protein bar is identifiable which has a maximum amount of protein with a minimal number of calories and a minimum amount of total fat. In this manner, the described systems improve conventional augmented reality systems for comparing physical objects particularly in scenarios in which some characteristics of the multiple displayed characteristics are related or involve tradeoffs such as a number of calories versus an amount of protein.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 and/or the display device 106 includes an image capture device 108 which is implementable to capture digital images, digital videos, etc. Although the computing device 102 is illustrated as including a single image capture device 108, it is to be appreciated that the image capture device 108 is representative of multiple image capture devices 108 in some examples. For example, the image capture device 108 represents a first image capture device 108 having a telephoto lens, a second image capture device 108 having a wide-angle lens, a third image capture device 108 having an ultra wide-angle lens, and so forth.

As shown, the image capture device 108 captures digital video frames depicting a physical environment 110. The physical environment 110 is illustrated to include physical objects 112-116 and physical markers 118-122. For example, the physical objects 112-116 are any objects that are similar or dissimilar In one example, the physical objects 112-116 are dietary supplements such as protein bars. In another example, the physical objects 112-116 different types of non-prescription medication such as antacids. In some examples, the physical objects 112-116 are automobiles, medical devices, houseplants, and so forth.

The physical markers 118-122 are any markers that are detectable using the image capture device 108 and a detection algorithm such as using computer vision. For instance, the physical markers 118-122 include visual features which are capable of encoding information such as code bins that have color values that correspond to numbers and/or letters. For example, the physical markers 118-122 are Hiro markers, barcode markers, pattern markers, etc. In some examples, the physical markers 118-122 include visual features configured to be detected using the image capture device 108 and keypoint localization.

In an example, each of the physical markers 118-122 is associated with one of the physical objects 112-116 based on an association distance. The association distance is a minimum distance between a particular one of the physical markers 118-122 and a particular one of the physical objects 112-116. Since any particular one of the physical markers 118-122 is disposed in the physical environment 110 such that the particular one of the physical markers 118-122 is closest to one of the physical objects 112-116, the association distance prevents multiple ones of the physical markers 118-122 from being associated with a single one of the physical objects 112-116. Similarly, the association distance also prevents multiple ones of the physical objects 112-116 from being associated with a single one of the physical markers 118-122. In the illustrated example, physical marker 118 is associated with physical object 112 based on an association distance between the physical marker 118 and the physical object 112; physical marker 120 is associated with physical object 114 based on an association distance between the physical marker 120 and the physical object 114; and physical marker 122 is associated with physical object 116 based on an association distance between the physical marker 122 and the physical object 116.

The computing device 102 also includes a comparison module 124 and a storage device 126 which is illustrated to include video data 128. For example, the comparison module 124 is illustrated as having, receiving, and/or transmitting the video data 128. The video data 128 describes frames of a digital video captured using the image capture device 108. For instance, the frames of the digital video depict the physical environment 110 including the physical objects 112-116 and the physical markers 118-122.

In one example, the comparison module 124 processes the video data 128 to detect the physical objects 112-116 and the physical markers 118-122. For example, the comparison module 124 processes the video data 128 to detect the physical markers 118-122 using marker detection functionality included in an AR.js library. In this example, the comparison module 124 determines or generates a center position, a size, a three-dimensional orientation, and an object identifier (for an associated one of the physical objects 112-116) for each of the physical markers 118-122 using the marker detection functionality (e.g., keypoint localization functionality) included in the AR.js library. Continuing this example, the comparison module 124 determines an object identifier for the physical object 112 by detecting the physical marker 118; an object identifier for the physical object 114 by detecting the physical marker 120; and an object identifier for the physical object 116 by detecting the physical marker 122.

For example, the comparison module 124 detects the physical objects 112-116 using a trained machine learning model. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example, the comparison module 124 processes the video data 128 to detect the physical objects 112-116 using a machine learning model trained on training data to detect the physical objects 112-116. In this example, the training data includes digital images depicting each of the physical objects 112-116 as well as digital images that do not depict any of the physical objects 112-116. For example, the machine learning model is an EfficientDet model trained on labeled training data using the TensorFlow object detection application programming interface supported by TensorFlow 2. Continuing this example, the comparison module 124 uses the trained machine learning model to determine or generate an object identifier, a center position, and a size for each of the physical objects 112-116.

After detecting the physical markers 118-122 using the marker detection functionality and detecting the physical objects 112-116 using the trained machine learning model, the comparison module 124 associates a location of the one of physical markers 118-122 with a location of one of the physical objects 112-116, for example, based on corresponding association distances. To do so in one example, the comparison module 124 converts or projects two-dimensional coordinates of each of the detected physical objects 112-116 described by the video data 128 into three-dimensional coordinates of the physical environment 110. The comparison module 124 then determines a distance from the image capture device 108 to each of the physical objects 112-116 based on a distance from the image capture device 108 to a corresponding one of the physical markers 118-122. For instance, the comparison module 124 determines a distance from the image capture device 108 to the physical object 112 is equal to a distance from the image capture device 108 to the physical marker 118; a distance from the image capture device 108 to the physical object 114 is equal to a distance from the image capture device 108 to the physical marker 120; and a distance from the image capture device 108 to the physical object 116 is equal to a distance from the image capture device 108 to the physical marker 122. By projecting or converting the two-dimensional coordinates of each of the detected physical objects 112-116 into three-dimensional world coordinates (e.g., coordinates of the physical environment 110) and determining a distance from the image capture device 108 to each of the detected physical objects 112-116, the comparison module 124 determines an estimated location of each of the detected physical objects 112-116 which is usable for displaying virtual objects for comparing the physical objects 112-116. As used herein, the term "virtual object" refers to a computer-generated object that is displayable in a user interface and that does not exist in a physical environment such as the physical environment 110. Examples of virtual objects include graphics, text, radar charts, etc.

Before generating the virtual objects for comparing the physical objects 112-116, the comparison module 124 optionally receives input data 130. For example, the comparison module 124 is illustrated as having, receiving, and/or transmitting the input data 130. The input data 130 describes a user interaction with an input device (e.g., a touchscreen, a stylus, a microphone, a mouse, a keyboard, etc.) that indicates particular characteristics of the physical objects 112-116. In one example, the input data 130 describes indications of particular characteristics of the physical objects 112-116 to be included in a comparison of the physical objects 112-116. In another example, the input data 130 describes indications of particular characteristics of the physical objects 112-116 to be excluded from a comparison of the physical objects 112-116.

Consider an example in which the physical objects 112-116 are boxes of protein bars or individual protein bars. The physical object 112 is a first flavor/type/brand of protein bar; the physical object 114 is a second flavor/type/brand of protein bar; and the physical object 116 is a third flavor/type/brand of protein bar. In this example, the user views the physical objects 112-116 in the physical environment 110 but is unable to distinguish which of the physical objects 112-116 includes the most protein with the least calories.

Continuing this example, the user interacts with the input device to generate the input data 130 as describing indications of calories and protein as the particular characteristics of the physical objects 112-116 to be included in a comparison of the physical objects 112-116. In some examples, the user generates the input data 130 as describing a request for a virtual object to be generated to indicate which of the physical objects 112-116 has the most protein and the least calories. Regardless of whether of not the user generates the input data 130, the comparison module 124 accesses characteristic data 132 that describes characteristics of each of the physical objects 112-116.

For example, the characteristic data 132 is available locally to the computing device 102 (e.g., the characteristic data 132 is stored on the storage device 126). In the illustrated example, the comparison module 124 receives the characteristic data 132 from a remote characteristic database 134 via the network 104. For instance, the comparison module 124 communicates data describing the object identifiers for the physical objects 112-116 determined by detecting the physical markers 118-122 and/or by detecting the physical objects 112-116 to the characteristic database 134 via the network 104. In response to receiving the data describing the object identifiers for the physical objects 112-116, the characteristic database 134 transmits the characteristic data 132 as describing the characteristics of each of the physical objects 112-116 to the comparison module 124 via the network 104.

In one example, the characteristic data 132 describes all of the information available that is related to each one of the physical objects 112-116. For example, the characteristic data 132 describes information related to the physical objects 112-116 which includes numerical characteristics of the physical objects 112-116, categorical characteristics of the physical objects 112-116, and so forth. In this example, the information related to the physical objects 112-116 includes information provided and maintained on the characteristic database 134 by a manufacturer of the physical objects 112-116 such as nutrition information, ingredient warnings (e.g., contains peanuts), serving suggestions, and so forth. The information described by the characteristic data 132 also includes information made available to the characteristic database 134 from other sources such as temporal discounts (e.g., coupons or vouchers), special offers, product ratings, product reviews, etc. For example, the characteristic data 132 describes a temporal characteristic of the physical objects 112-116 that changes after a date indicated by the temporal characteristic (e.g., the physical objects 112-116 expire after a particular expiration date).

In the example in which the user generates the input data 130 describing the indications of calories and protein, the comparison module 124 processes the input data 130 and the characteristic data 132 to identify a subset of the characteristics of the physical objects 112-116 which includes calorie information for the physical objects 112-116 and protein information for the physical objects 112-116. The comparison module 124 determines a three-dimensional orientation of the physical object 112 using the three-dimensional orientation of the physical marker 118; a three-dimensional orientation of the physical object 114 using the three-dimensional orientation of the physical marker 120; and a three-dimensional orientation of the physical object 116 using the three-dimensional orientation of the physical marker 122. For example, the comparison module 124 processes the video data 128, the input data 130, and/or the characteristic data 132 to display frames of a digital video 136 in a user interface 138 of the display device 106 that is augmented with virtual objects.

As shown, the virtual objects include indications of a subset of the characteristics of the physical objects 112-116. The comparison module 124 displays the virtual objects having the three-dimensional orientations determined for the corresponding physical objects 112-116. A first virtual object displayed relative to the physical object 112 indicates that the physical object 112 includes "300 Calories" and "11 g of Protein." A second virtual object displayed relative to the physical object 114 indicates that the physical object 114 includes "250 Calories" and "14 g of Protein." Similarly, a third virtual object displayed relative to the physical object 116 indicates that the physical object 116 includes "270 Calories" and "13 g of Protein." In some examples, the indications of the subset of the characteristics of the physical objects 112-116 are normalized for comparison such as in examples in which the physical objects 112-116 are protein bars having different serving sizes or characteristics are specified in different units (e.g., grams versus ounces).

In the example in which the user generates the input data 130 as describing the request for the virtual object to be generated to indicate which of the physical objects 112-116 has the most protein and the least calories, the comparison module 124 displays a virtual object 140 over the frames of the digital video 136 captured by the image capture device 108. The virtual object 140 indicates that the physical object 114 has more protein and less calories than the physical object 112 and the physical object 116. For example, the user interacts with the input device relative to the user interface 138 to display additional information about the physical object 114 such as allergy information and/or to acquire the physical object 114.

Figure 2:
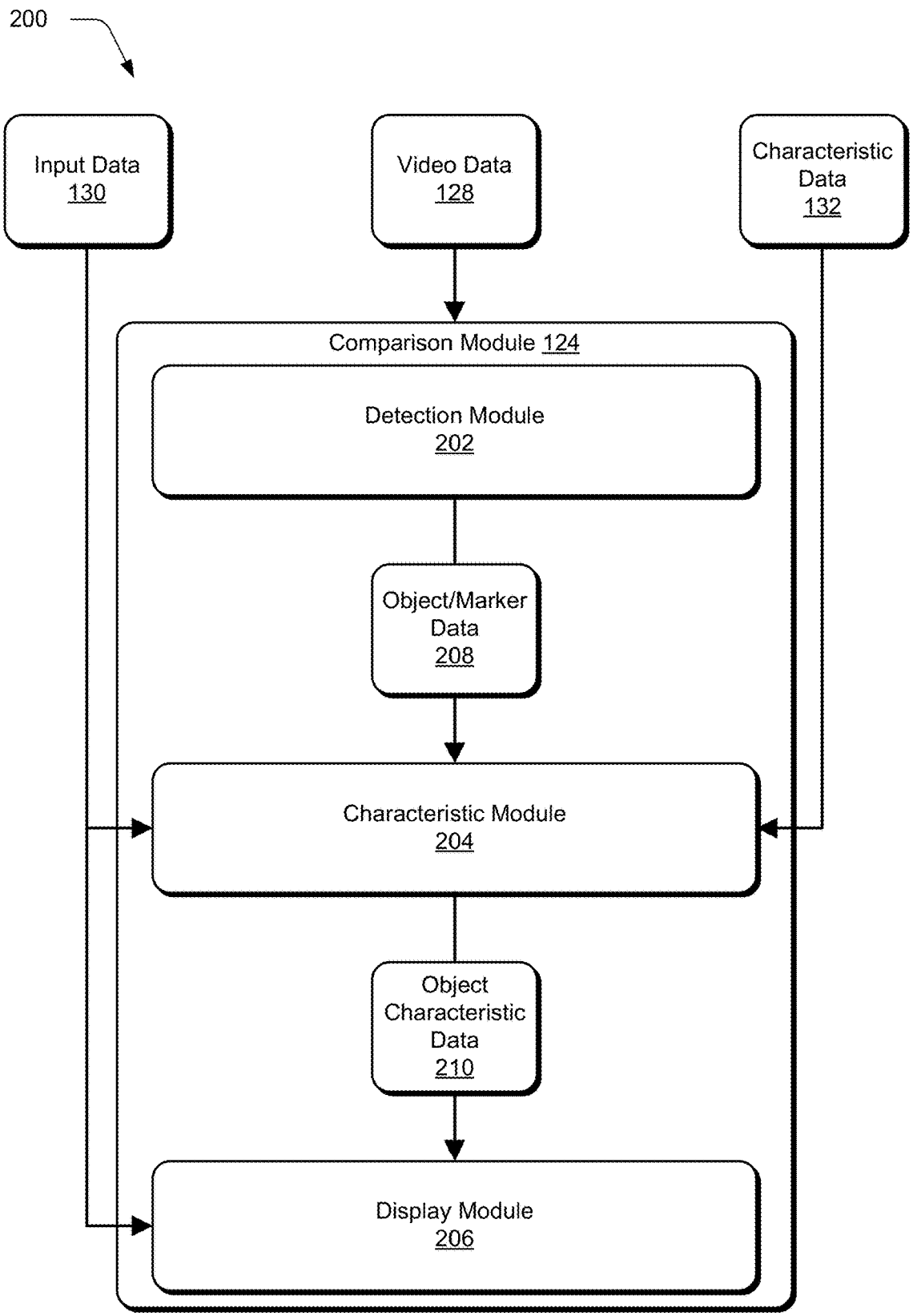
FIG. 2 depicts a system in an example implementation showing operation of a comparison module for implementing augmented reality systems for comparing physical objects.

FIG. 2 depicts a system 200 in an example implementation showing operation of a comparison module 124. The comparison module 124 is illustrated to include a detection module 202, a characteristic module 204, and a display module 206. For instance, the comparison module 124 receives the video data 128, the input data 130, and the characteristic data 132 as inputs. In one example, the detection module 202 receives and processes the video data 128 to generate object/marker data 208.

Figure 3A:
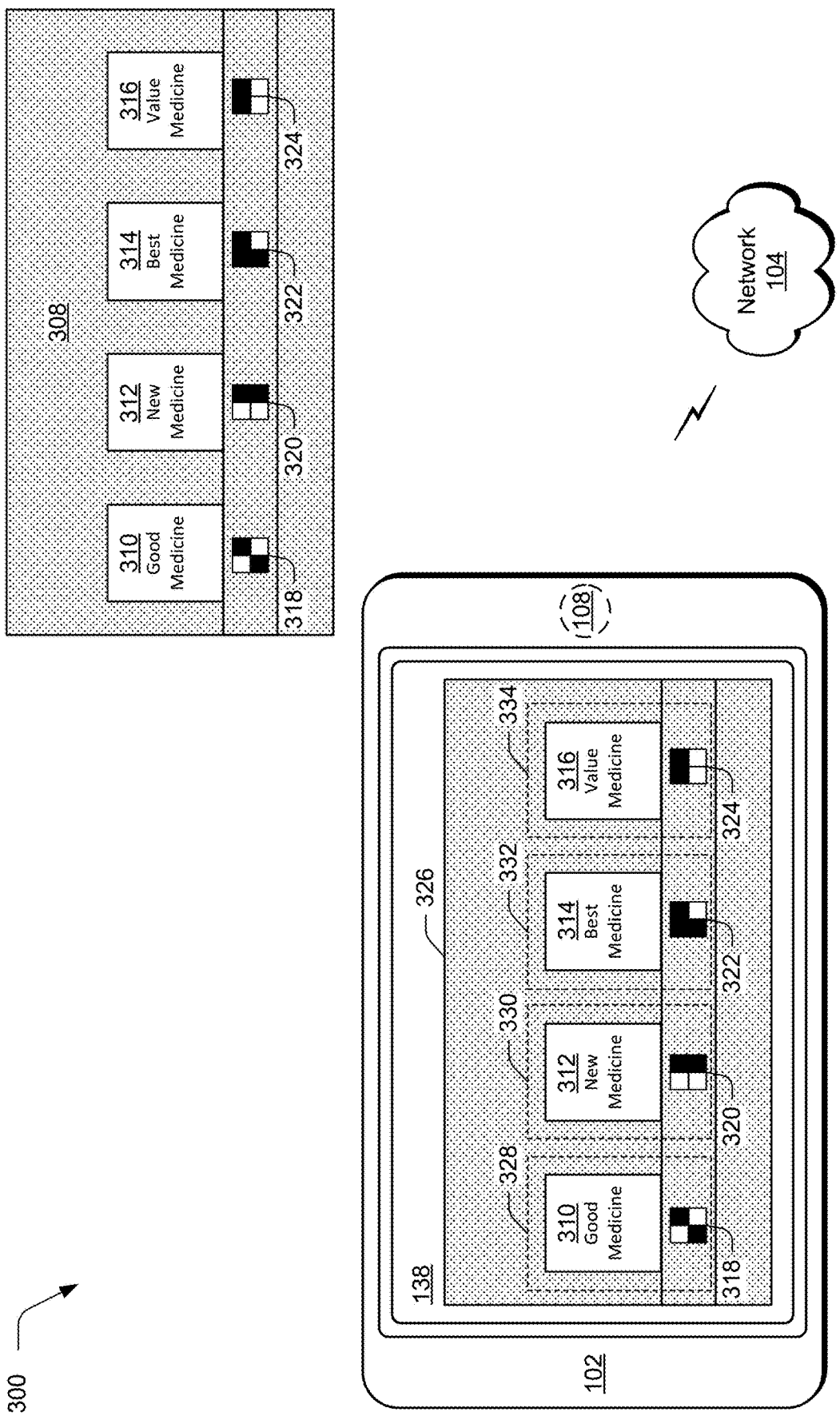
FIGS. 3A, 3B, 3C, and 3D illustrate an example of augmented reality systems for comparing physical objects.
Figure 3B:
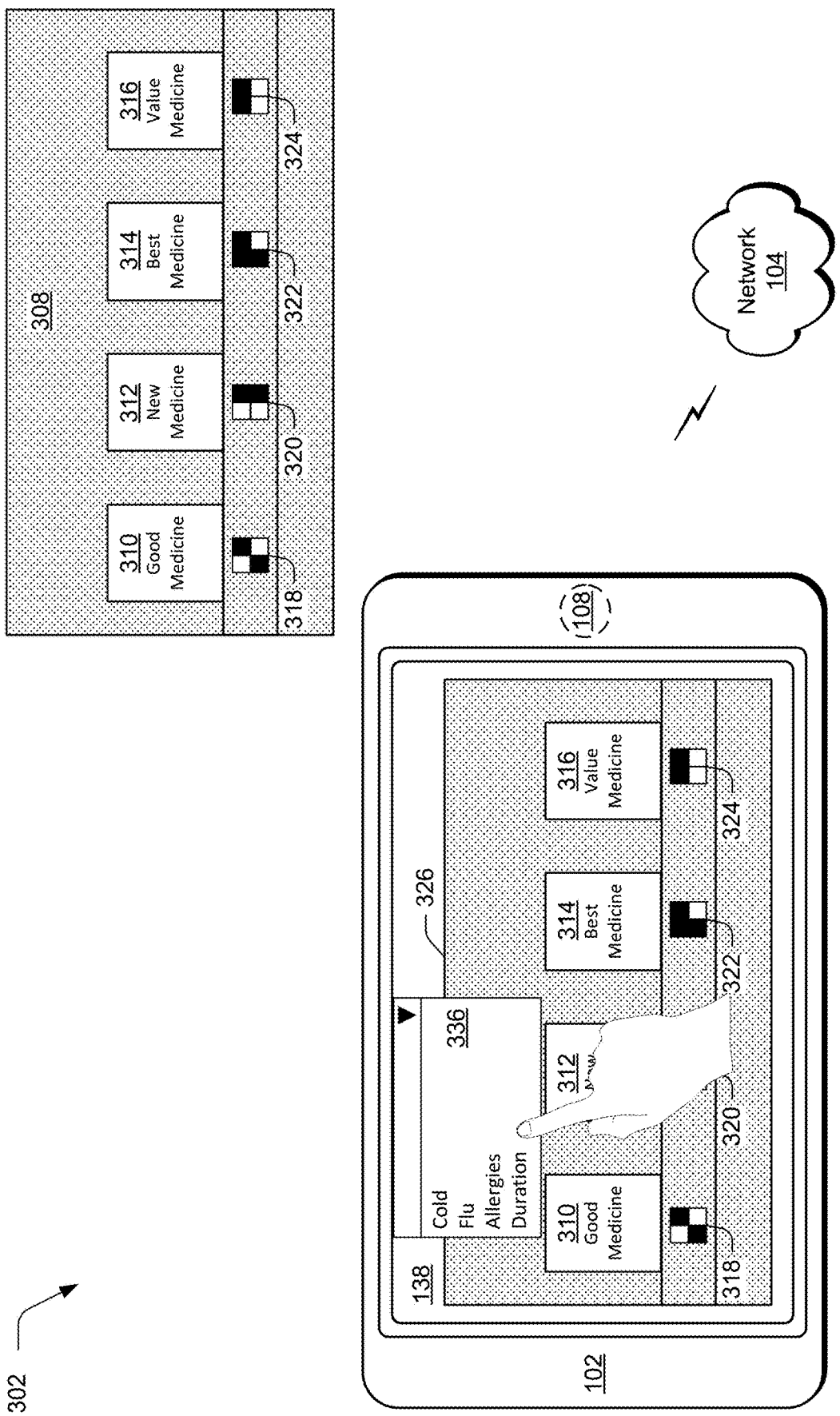
Figure 3C:
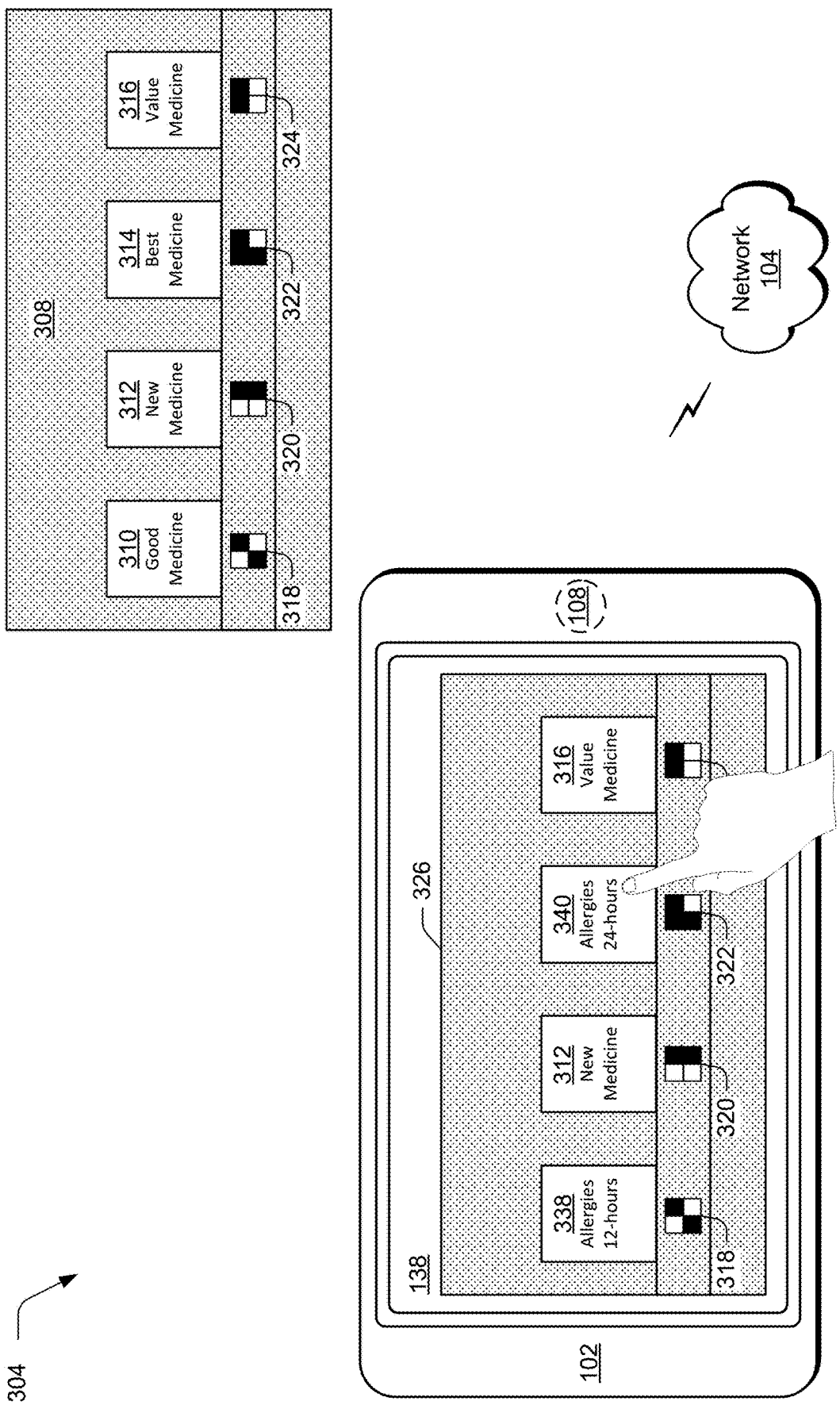
Figure 3D:
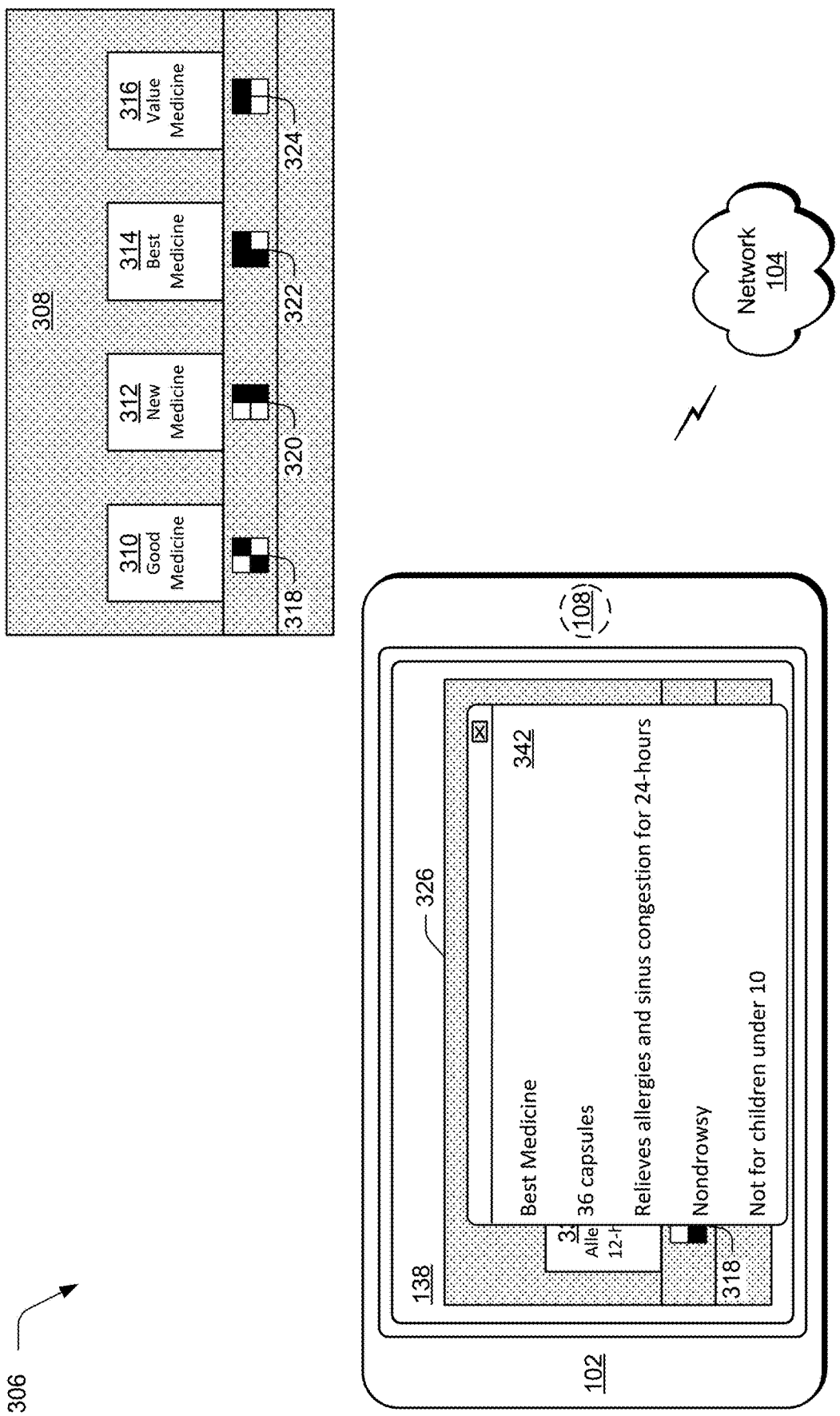

FIGS. 3A, 3B, 3C, and FIG. 3D illustrate an example of augmented reality systems for comparing physical objects. FIG. 3A illustrates a representation 300 of capturing frames of a digital video that depict physical objects and physical markers. FIG. 3B illustrates a representation 302 of generating the input data 130. FIG. 3C illustrates a representation 304 of generated virtual objects having indications of characteristics of the physical objects. FIG. 3D illustrates a representation 306 of additional information displayed about a particular physical object based on a user interaction with a particular virtual object.

With reference to FIG. 2 and FIG. 3A, the representation 300 includes a physical environment 308 that includes physical objects 310-316 and physical markers 318-324. The image capture device 108 captures frames of a digital video 326 that is displayed in the user interface 138 of the display device 106 and/or the computing device 102. As shown, the physical objects 310-316 are types of medicine. For instance, the physical object 310 indicates it is "Good Medicine," the physical object 312 indicates it is "New Medicine," the physical object 314 indicates it is "Best Medicine," and the physical object 316 indicates it is "Value Medicine." Based on the information displayed in the physical environment, it is not possible to meaningfully evaluate or compare the physical objects 310-316.

The detection module 202 receives the video data 128 describing the digital video 326 and the detection module 202 processes the video data 128 to detect the physical markers 318-324 and the physical objects 310-316. For example, the detection module 202 detects the physical markers 318-324 using keypoint localization based marker detection functionality included in an AR.js library. In the illustrated example, the physical markers 318-324 are pattern markers and the detection module 202 uses the marker detection functionality to determine a center position, a size, a three-dimensional orientation, and an object identifier for each of the physical markers 318-324.

The detection module 202 also detects the physical objects 310-316 which the detection module 202 performs in a manner that is independent from the marker detection used to detect the physical markers 318-324. For example, the detection module 202 includes a machine learning model trained on training data (e.g., labeled digital images) to detect the physical objects 310-316. In one example, the machine learning model is an EfficientDet model trained on labeled training data using the TensorFlow object detection application programming interface supported by TensorFlow 2. For instance, the labeled training data includes labeled digital images depicting each of the physical objects 310-316 and labeled digital images that do not depict any of the physical objects 310-316. The machine learning model is trained to detect and classify the physical objects 310-316 using the labeled training data.

In an example, the detection module 202 uses the trained machine learning model to determine an object identifier, a center position, and a size for each of the physical objects 310-316. The detection module 202 associates one of the detected physical markers 318-324 with one of the detected physical objects 310-316 based on an association distance. The association distance is a minimum distance from a physical marker to a physical object in the physical environment 308.

As shown, the detection module 202 associates the physical object 310 with the physical marker 318 as a pair 328; the physical object 312 with the physical marker 320 as a pair 330; the physical object 314 with the physical marker 322 as a pair 332; and the physical object 316 with the physical marker 324 as a pair 334. After establishing the pairs 328-334 the detection module 202 combines or fuses information determined by detecting the physical markers 318-324 with information determined by detecting the physical objects 310-316. To do so in one example, the detection module 202 converts or projects two-dimensional coordinates of the center position of the detected physical object 310 in the user interface 138 into three-dimensional world coordinates (e.g., three-dimensional coordinates of the physical environment 308) and determines that the detected physical object 310 is a distance from the image capture device 108 equal to a distance from the image capture device 108 to the detected physical marker 318 in the physical environment 308. In this manner, the detection module 202 estimates a location of the physical object 310 which the detection module 202 uses along with the three-dimensional orientation of the detected physical marker 318 to display a virtual object.

In an example in which the physical object 310 is detected and the physical marker 318 is not detected, the detection module 202 uses the center position and the size of the detected physical object 310 to display a virtual object without any rotation or transformation. In an example in which the physical marker 318 is detected and the physical object 310 is not detected, the detection module 202 uses the center position of the physical marker 318 and a fixed size for displaying a virtual object. The detection module 202 combines or fuses the information determined by detecting the physical markers 318-324 with the information determined by detecting the physical objects 310-316 for each of the pairs 330-334. For example, the detection module generates the object/marker data 208 as describing the fused information for each of the pairs 328-334.

The characteristic module 204 receives the video data 228, the input data 130, and the characteristic data 132 and the characteristic module 204 processes the video data 228, the input data 130, and/or the characteristic data 132 to generate object characteristic data 210. As shown in FIG. 3B, the representation 302 includes a user interface element 336. For instance, a user interacts relative to the user interface 138 using an input device (e.g., a finger of a hand and a touchscreen) to specify characteristics of the physical objects 310-316 to include in a comparison of the physical objects 310-316.

For example, the user interacts relative to the user interface element 336 to indicate "Allergies" and "Duration" as characteristics of the physical objects 310-310 to include in the comparison of the physical objects 310-316. In this example, the user has allergies and wants to know which of the medicines 310-316 is for managing allergies (if any) and how long any such medication lasts. Continuing this example, the characteristic module 204 receives the input data 130 as describing the indications of "Allergies" and "Duration" and the characteristic module 204 processes the characteristic data 132 based on the input data 130.

Consider an example in which the characteristic module 204 processes the object/marker data 208 to determine object identifiers for the physical objects 310-316 determined by detecting the physical markers 310-316 and also determined by detecting the physical objects 310-316. The characteristic module 204 communicates data describing the object identifiers for the physical objects 310-316 to the characteristic database 134 via the network 104. Upon receiving the data describing the object identifiers for the physical objects 310-316, the characteristic database 134 transmits the characteristic data 132 to the characteristic module 204 via the network.

Continuing the previous example, the characteristic module 204 receives the characteristic data 132 as describing all information available that is related to any of the physical objects 310-316. The characteristic module 204 filters the characteristic data 132 based on the input data 130 to identify a subset of the characteristic data 132 that describes treatment of allergies and durations of any such treatments. The characteristic module 204 generates the object characteristic data 210 as describing the subset of the characteristic data 132.

The display module 206 receives and processes the object characteristic data 210 to display virtual objects in the user interface 138 based on the subset of the characteristic data 132. With respect to FIG. 3C, the representation 304 includes a virtual object 338 which is displayed over the physical object 310 in the digital video 326 displayed in the user interface 138. As shown, the virtual object 338 indicates that the physical object 310 is medicine for "Allergies" which has a treatment duration of "12-hours."

The representation 304 also includes a virtual object 340 which is displayed over the physical object 314 in the digital video 326 displayed in the user interface 138. The virtual object 340 indicates that the physical object 314 is medicine for "Allergies" which has a treatment duration of "24-hours." No virtual objects are displayed over the physical object 312 or the physical object 316 in the digital video 326. This is because the physical objects 312, 316 do not match or include the characteristics of "Allergies" or "Duration" specified relative to the user interface element 336. In some examples, the display module 206 displays virtual objects over the physical objects 312, 316 to indicate that the physical objects 312, 316 do not match or include the characteristics specified by the user. In these examples, the display module 206 displays virtual objects over the physical objects 312, 316 which conceal or obfuscate the physical objects 312, 316 in the digital video 326.

Continuing this example and based on the virtual object 338 and the virtual object 340, the user prefers the allergy medicine 314 over the allergy medicine 310 because the allergy medicine 314 has a duration that is 12 hours longer than a duration of the allergy medicine 310. In one example, the user wishes to confirm that the allergy medicine 314 will not cause the user to become fatigued. In this example, the user interacts in the user interface 138 relative to the virtual object 340 to receive additional information about the physical object 314 such as additional information described by the characteristic data 132 or other additional information that is available via the network 104. For example, the display module 206 receives the input data 130 as describing the user's interaction with the virtual object 340 in the user interface 138 and the display module 206 processes the input data 130 and/or the object characteristic data 210 to display a user interface element 342 which is shown in the representation 306 depicted in FIG. 3D.

For instance, the user interface element 342 indicates the name of the allergy medicine 314 as "Best Medicine" which is also displayed on the physical object 314. However, the user interface element 342 also indicates a quantity of the allergy medicine 314 as "36 capsules" and that the allergy medicine 314 "Relieves allergies and sinus congestion for 24-hours." In the illustrated example, the user interface element 342 indicates that the allergy medicine 314 is "Not for children under 10" and is "Nondrowsy." Based on the indication that the allergy medicine 314 is "Nondrowsy," the user selects the physical object 314 by physically selecting the physical object 314 in the physical environment 308 or by interacting in the user interface 138 to place an order for the physical object 314.

In another example, the user interacts in the user interface 138 to toggle a display of the virtual objects 338, 340 such as to cease displaying the virtual objects 338, 340 over the digital video 326. For instance, the user interacts in the user interface to evaluate and compare additional ones of the physical objects 310-316. In some examples, the user interacts in the user interface 138 to display radar charts for the physical objects 310-316 or additional physical objects in the physical environment 308. In these examples, the display module 206 receives the input data 130 describing the user's interaction in the user interface 138 and the display module 206 processes the input data 130 and/or the object characteristic data 210 to display a radar chart in the user interface. Each axis of the radar chart has a same scale that considers all physical objects in the physical environment 308 of a same type. In this manner, the radar chart displays relative characteristics of the physical objects in the physical environment 308 for comparison so that a desirable physical object is quickly and visually identifiable.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which a physical object is detected and a virtual object is generated for display in a user interface that includes indications of a subset of characteristics of the physical object.

Physical objects and physical markers depicted in frames of a digital video captured by an image capture device of a computing device and displayed in a user interface of the computing device are detected (block 402). For example, the computing device 102 implements the comparison module 124 to detect the physical objects and the physical markers depicted in the frames of the digital video. A physical object of the physical objects is associated with a physical marker of the physical markers based on an association distance estimated using two-dimensional coordinates of the user interface corresponding to a center of the physical object and a distance from the image capture device to the physical marker (block 404). In some examples, the comparison module 124 associates the physical object with the physical marker.

Characteristics of the physical object that are not displayed in the user interface are determined based on an identifier of the physical marker (block 406). The computing device 102 implements the comparison module 124 to determine the characteristics of the physical object that are not displayed in the user interface in some examples. A virtual object is generated for display in the user interface that includes indications of a subset of the characteristics of the physical object and an additional virtual object is generated for display in the user interface that includes indications of characteristics of an additional physical object of the physical objects (block 408). For example, the comparison module 124 generates the virtual object for display in the user interface.

Figure 5A:
Figure 5B:
Figure 5C:
Figure 5D:
Figure 5E:
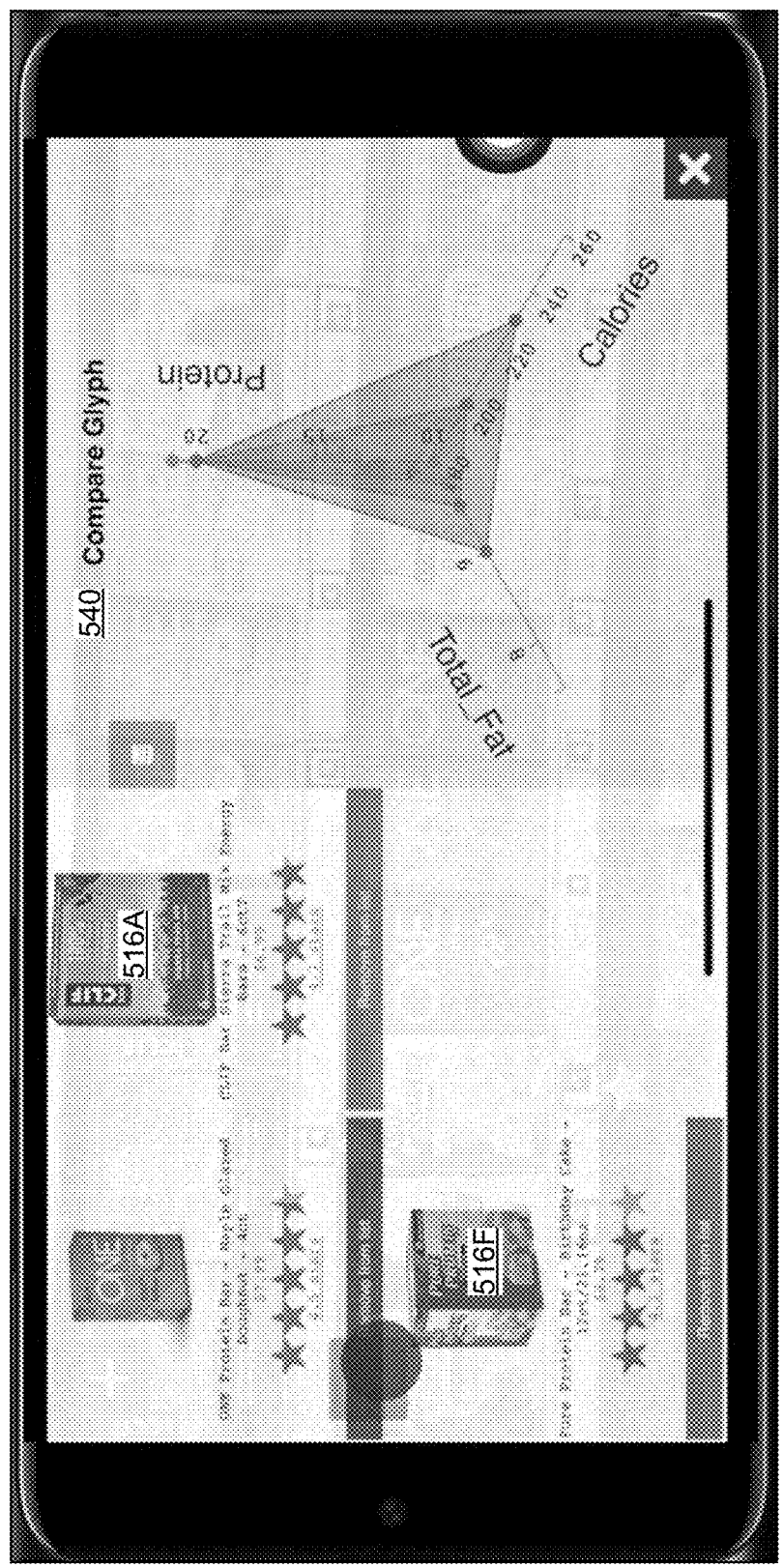
Figure 57:
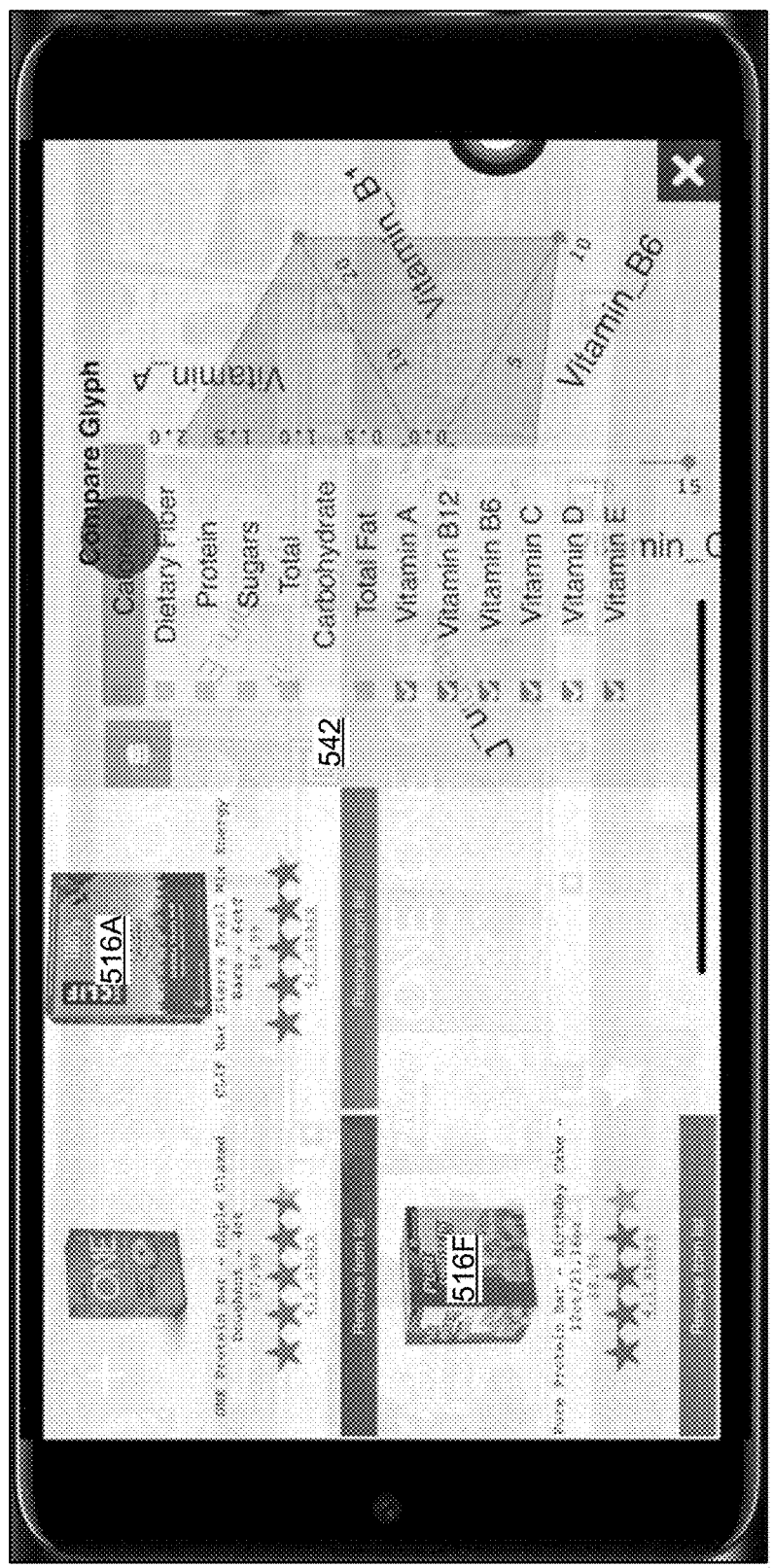
Figure 5G:
Figure 57A:

FIGS. 5A, 5B, 5C, 5D, 5E, 5F, 5G, and 5H illustrate a user interface of augmented reality systems for comparing physical objects. FIG. 5A illustrates a representation 500 of physical objects and physical markers depicted in frames of a digital video. FIG. 5B illustrates a representation 502 of a filtering interface. FIG. 5C illustrates a representation 504 of indications of physical objects that include characteristics specified via the filter interface. FIG. 5D illustrates a representation 506 of virtual objects displayed over physical objects depicted in the digital video for comparison of the physical objects. FIG. 5E illustrates a representation 508 of a radar chart for comparing physical objects. FIG. 5F illustrates a representation 510 of a radar chart configuration interface. FIG. 5G illustrates a representation 512 of a configured radar chart. FIG. 5H illustrates a representation 514 of a review that describes a physical object.

With reference to FIG. 5A, the representation 500 includes physical objects 516A-516J and physical markers 518A-518J which are depicted in frames of a digital video displayed in a user interface of a computing device. As shown, the physical objects 516A-516J are protein bars and the physical markers 518A-518J are pattern markers. It is not possible to for a user to select one of the physical objects 516A-516J as having characteristics desired by the user because information that is important to the user (e.g., characteristics of the physical objects 516A-516J) is not displayed in the user interface.

The representation 502 of FIG. 5B includes a filtering interface 520 and the user interacts with an input device (e.g., a finger and a touchscreen, a stylus, a mouse, a microphone, a keyboard, etc.) relative to the user interface to interact in the filtering interface 520. The filtering interface 520 includes selectable indications of "PRICE," "RATING," "BRAND," "PROTEIN," "CALORIES," "FLAVOR," and "DIETARY NEEDS." The user interacts with the input device to indicate values or value ranges for at least some of the selectable indications of the filtering interface 520 to define characteristics of the physical objects 516A-516J which are important to the user. For example, the comparison module 124 receives the input data 130 as describing the values or value ranges specified by the user.

As shown in FIG. 5C, the comparison module 124 displays an indication 522 over the digital video in the user interface to indicate that physical object 516A has the characteristics that are important to the user. Similarly, the comparison module 124 displays an indication 524 over the digital video to indicate that physical object 516D has the characteristics that are important to the user; an indication 526 over the digital video to indicate that physical object 516F has the characteristics that are important to the user; and an indication 526 over the digital video to indicate that physical object 516H has the characteristics that are important to the user.

With reference to FIG. 5D, the user interacts in the user interface to display virtual objects 530-536 over the digital video. For instance, virtual object 530 is displayed over the physical object 516A and includes a radar chart illustrating amounts of protein, calories, and total fat included in the protein bars 516A. Virtual object 532 is displayed over the physical object 516D and includes a radar chart illustrating amounts of protein, calories, and total fat included in the protein bars 516D. As shown, virtual object 534 is displayed over the physical object 516F and includes a radar chart illustrating amounts of protein, calories, and total fat included in the protein bars 516F. Finally, virtual object 536 is displayed over the physical object 516H and includes a radar chart illustrating amounts of protein, calories, and total fat included in the protein bars 516H. By displaying the virtual objects 532-536 over the digital video in this manner, the user is able to simultaneously compare the amounts of protein, calories, and total fat included in the protein bars 516A, 516D, 516F, 516H which have already been filtered from the protein bars 516A-516J as having the characteristics that are important to the user.

With respect to FIG. 5E, the representation 508 includes a radar chart for comparing physical objects 540. In particular, the radar chat for comparing physical objects 540 illustrates a detailed comparison of the protein bars 516A and the protein bars 516F. With reference to FIG. 5F, the representation 510 includes a radar chart configuration interface 542. For example, the user interacts with the input device relative to the user interface to indicate additional characteristics shown in the radar chart configuration interface 542 to include in a comparison of the physical object 516A and the physical object 516F. As shown, the user indicates "Vitamin A," "Vitamin B12," "Vitamin B6," "Vitamin C," "Vitamin D," and "Vitamin E" to include in the comparison of the protein bars 516A and the protein bars 516F. This comparison is illustrated as a configured radar chart 544 in the representation 512 depicted in FIG. 5G. For instance, the user interacts with the input device relative to the user interface to display a customer review 546 for the protein bars 516A which is included in the representation 514. As illustrated in FIG. 5H, the customer review 546 describes the protein bars 516A favorably. Of the protein bars 516A-516J, the user selects the protein bars 516A which is performable through interaction with the described augmented reality systems for comparing physical objects in mere seconds. Furthermore, of the protein bars 516A-516J, the user only performs a detailed analysis for the protein bars 516A, 516D, 516F, 516H which were filtered from the protein bars 516A-516J as having the characteristics that are important to the user.

Figure 6A:
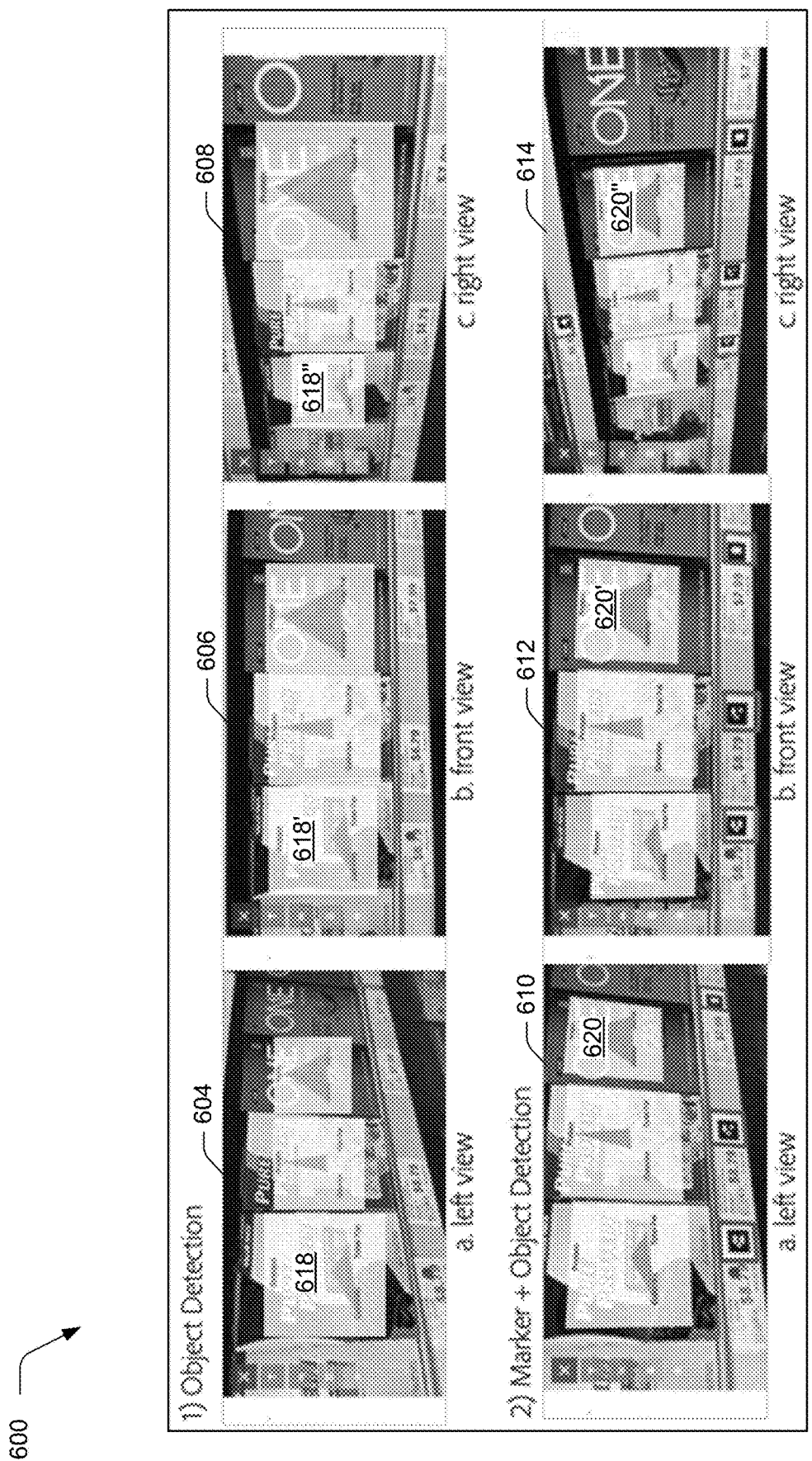
FIGS. 6A and 6B illustrate representations of virtual objects displayed having orientations of corresponding detected physical objects and virtual objects displayed having orientations of corresponding detected physical markers.
Figure 6B:
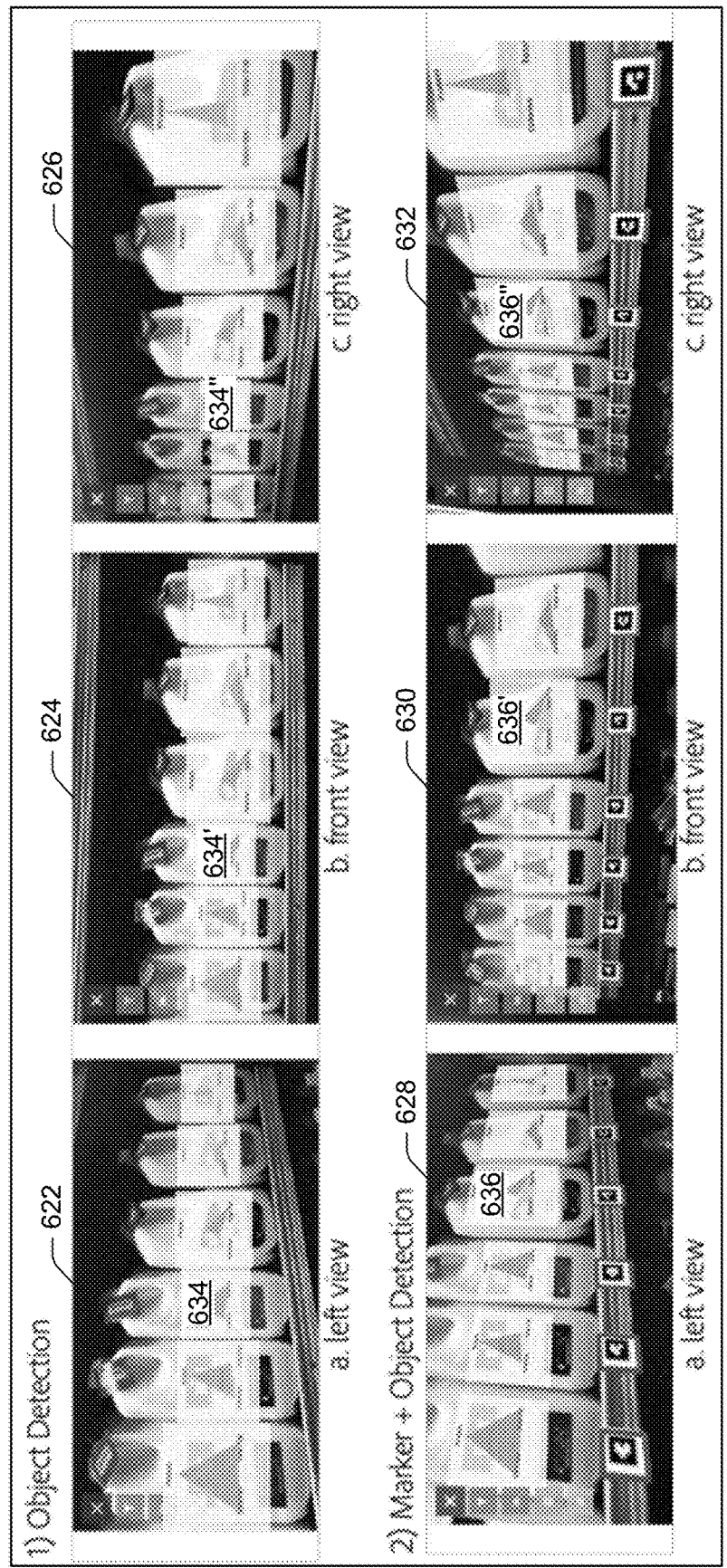

FIGS. 6A and 6B illustrate representations of virtual objects displayed having orientations of corresponding detected physical objects and virtual objects displayed having orientations of corresponding detected physical markers. FIG. 6A illustrates a representation 600 of virtual objects displayed relative to physical objects that are protein bars. FIG. 6B illustrates a representation 602 of virtual objects displayed relative to physical objects that are containers of milk.

The representation 600 includes frames 604-608 of a digital video that is augmented with virtual objects displayed over corresponding physical objects (protein bars) such that the virtual objects are displayed as having orientations of the corresponding physical objects. For instance, frame 604 depicts a left view of a virtual object having a first orientation 618 which is an orientation of a corresponding physical object as depicted in the frame 604. Frame 606 depicts a front view of the virtual object having a second orientation 618' which is an orientation of the corresponding physical object as depicted in the frame 606. As shown, frame 608 depicts a right view of the virtual object having a third orientation 618" which is an orientation of the corresponding physical object as depicted in the frame 608.

The representation 600 also includes frames 610-614 of a digital video that is augmented with virtual objects displayed over corresponding physical objects (protein bars) such that the virtual objects are displayed as having orientations of corresponding physical markers. For example, frame 610 depicts a left view of a virtual object having a first orientation 620 which is an orientation of a corresponding physical marker as depicted in the frame 610. In an example, the comparison module 124 determines the first orientation 620 using keypoint localization to estimate the orientation of the corresponding physical marker. Frame 612 depicts a front view of the virtual object having a second orientation 620' which is an orientation of the corresponding physical marker as depicted in the frame 612. Similarly, frame 614 depicts a right view of the virtual object having a third orientation 620" which is an orientation of the corresponding physical marker as depicted in the frame 614.

With respect to FIG. 6B, the representation 602 includes frames 622-626 of a digital video that is augmented with virtual objects displayed over corresponding physical objects (containers of milk) such that the virtual objects are displayed as having orientations of the corresponding physical objects. Frame 622 depicts a left view of a virtual object having a first orientation 634 which is an orientation of a corresponding physical object as depicted in the frame 622. Frame 624 depicts a front view of the virtual object having a second orientation 634' which is an orientation of the corresponding physical object as depicted in the frame 624. For instance, frame 626 depicts a right view of the virtual object having a third orientation 634" which is an orientation of the corresponding physical object as depicted in the frame 626.

The representation 602 also includes frames 628-632 of a digital video that is augmented with virtual objects displayed over corresponding physical objects (containers of milk) such that the virtual objects are displayed as having orientations of corresponding physical markers. Frame 628 depicts a left view of a virtual object having a first orientation 636 which is an orientation of a corresponding physical marker as depicted in the frame 628. For example, frame 630 depicts a front view of the virtual object having a second orientation 636' which is an orientation of the corresponding physical marker as depicted in the frame 630. Finally, frame 632 depicts a right view of the virtual object having a third orientation 636" which is an orientation of the corresponding physical marker as depicted in the frame 632.

Example System and Device

Figure 7:
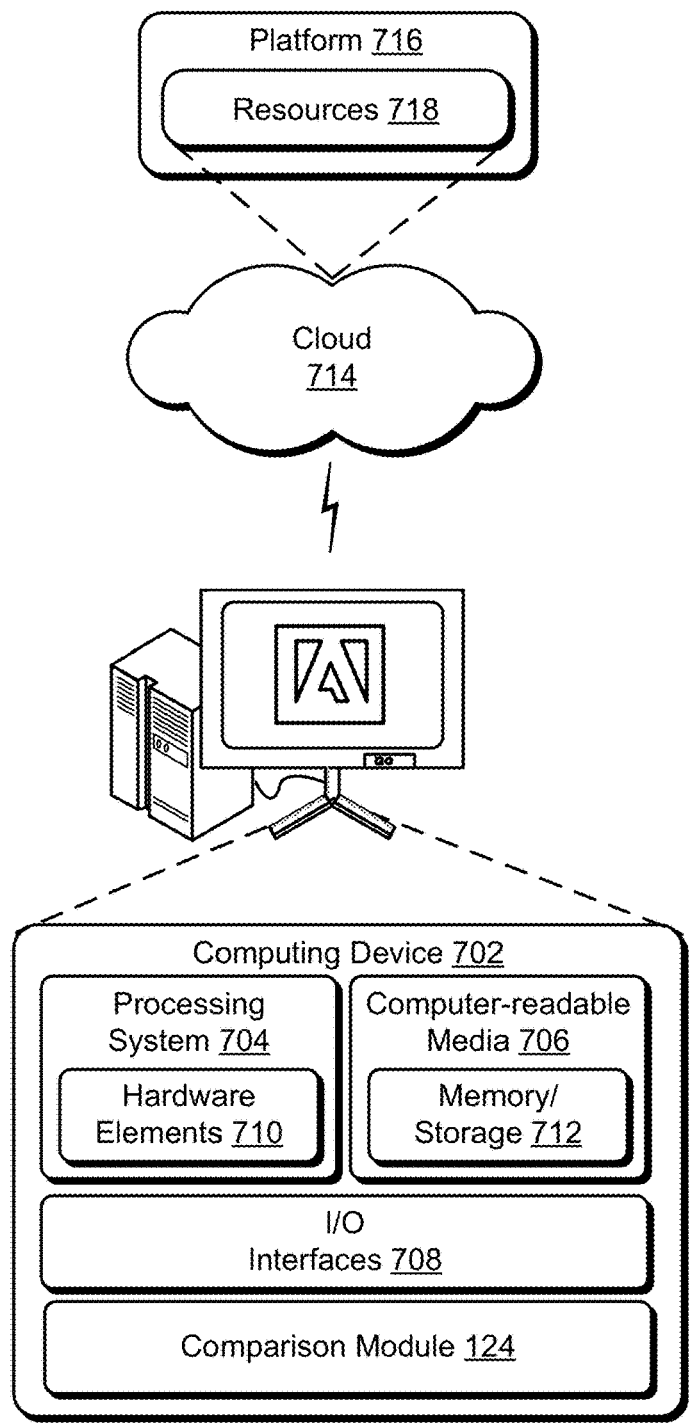
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the comparison module 124. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of augmented reality systems for comparing physical objects have been described in language specific to structural features and/or methods, it is to be understood that the appended claims are not necessarily limited to the specific features or methods described. Rather, the specific features and methods are disclosed as example implementations of augmented reality systems for comparing physical objects, and other equivalent features and methods are intended to be within the scope of the appended claims. Further, various different examples are described and it is to be appreciated that each described example is implementable independently or in connection with one or more other described examples.

What is claimed is:

1. A method comprising:
   detecting, by a computing device, physical objects and physical markers depicted in frames of a digital video captured by an image capture device of the computing device and displayed in a user interface of the computing device;
   associating, by the computing device, a physical object of the physical objects with a physical marker of the physical markers based on an association distance estimated using two-dimensional coordinates of the user interface corresponding to a center of the physical object and a distance from the image capture device to the physical marker;
   determining, by the computing device, characteristics of the physical object that are not displayed in the user interface based on an identifier of the physical marker;
   determining, by the computing device, an orientation of the physical object based on an orientation of the physical marker; and
   generating, by the computing device, for display in the user interface, a virtual object that includes indications of a subset of the characteristics of the physical object and an additional virtual object that includes indications of characteristics of an additional physical object of the physical objects, the virtual object having the orientation of the physical object.

2. The method as described in claim 1, wherein the association distance is a distance between the physical object and the physical marker.

3. The method as described in claim 1, wherein the characteristics of the physical object are received via a network from a characteristic database based on the identifier of the physical marker.

4. The method as described in claim 3, wherein the characteristics of the physical object include numerical characteristics and categorical characteristics.

5. The method as described in claim 3, wherein the characteristics of the physical object include a temporal characteristic that changes after a date indicated by the temporal characteristic.

6. The method as described in claim 1, further comprising:
   receiving input data describing a user interaction in the user interface; and
   determining the subset of the characteristics of the physical object based on the input data.

7. The method as described in claim 1, further comprising:
   associating the additional physical object with an additional physical marker of the physical markers; and
   determining the characteristics of the additional physical object based on an identifier of the additional physical marker.

8. The method as described in claim 7, wherein the subset of the characteristics of the physical object includes a numerical characteristic having a first value and the characteristics of the additional physical object include the numerical characteristic having a second value.

9. The method as described in claim 7, wherein the characteristics of the additional physical object include a categorical characteristic that is not included in the subset of the characteristics of the physical object.

10. A system comprising:
    a detection module implemented at least partially in hardware of a computing device to:
        detect physical objects and physical markers depicted in frames of a digital video captured by an image capture device and displayed in a user interface;
        associate a physical object of the physical objects with a physical marker of the physical markers based on an association distance estimated using two-dimensional coordinates of the user interface corresponding to a center of the physical object and a distance from the image capture device to the physical marker; and
        determine an orientation of the physical object based on an orientation of the physical marker;
    a characteristic module implemented at least partially in the hardware of the computing device to determine characteristics of the physical object that are not displayed in the user interface based on an identifier of the physical marker; and
    a display module implemented at least partially in the hardware of the computing device to generate a virtual object having the orientation of the physical object for display in the user interface, the virtual object includes indications of a subset of the characteristics of the physical object.

11. The system as described in claim 10, wherein the subset of the characteristics of the physical object is determined based on input data describing a user interaction in the user interface.

12. The system as described in claim 10, wherein the association distance is a distance between the physical object and the physical marker.

13. The system as described in claim 10, wherein the characteristics of the physical object include numerical characteristics and categorical characteristics and wherein the subset of the characteristics of the physical object includes a subset of the numerical characteristics.

14. The method as described in claim 1, wherein the virtual object comprises a radar chart comparing the characteristics of the physical object and the additional physical object.

15. The method as described in claim 1, further comprising filtering, by the computing device, the characteristics of the physical object and the additional physical object based on one or more user-defined important characteristics.

16. One or more computer-readable storage media comprising instructions stored thereon that, responsive to execution by a computing device, causes the computing device to perform operations including:
    detecting physical objects and physical markers depicted in frames of a digital video captured by an image capture device and displayed in a user interface;
    associating a first physical object with a first physical marker based on first coordinates of the user interface and a distance between the image capture device and the first physical marker;
    associating a second physical object with a second physical marker based on second coordinates of the user interface and a distance between the image capture device and the second physical marker;
    determining characteristics of the first physical object based on an identifier of the first physical marker and determining characteristics of the second physical object based on an identifier of the second physical marker; and
    generating a first digital object and a second digital object for display in the user interface, the first digital object has an orientation of the first physical object determined based on an orientation of the first physical marker, the first digital object includes indications of a subset of the characteristics of the first physical object, and the second digital object includes indications of a subset of the characteristics of the second physical object.

17. The one or more computer-readable storage media as described in claim 16, wherein the indications of the subset of the characteristics of the first physical object are normalized for comparison with the indications of the subset of the characteristics of the second physical object.

18. The one or more computer-readable storage media as described in claim 16, wherein the subset of the characteristics of the first physical object includes a numerical characteristic having a first value and wherein the subset of the characteristics of the second physical object includes the numerical characteristic having a second value.

19. The one or more computer-readable storage media as described in claim 16, wherein the subset of the characteristics of the first physical object includes a categorical characteristic that is not included in the subset of the characteristics of the second physical object.

20. The one or more computer-readable storage media as described in claim 16, wherein the characteristics of the first physical object include a temporal characteristic that changes after a date indicated by the temporal characteristic.

\* \* \* \* \*